(12) United States Patent
Austin et al.

(10) Patent No.: US 12,441,331 B2
(45) Date of Patent: Oct. 14, 2025

(54) SYSTEM FOR PROVIDING FEEDBACK BASED ON PEDAL TOUCHING

(71) Applicant: TOYOTA MOTOR ENGINEERING & MANUFACTURING NORTH AMERICA, INC., Plano, TX (US)

(72) Inventors: Benjamin Piya Austin, Saline, MI (US); Heishiro Toyoda, Mountain View, CA (US); Philip J. Babian, Canton, MI (US); Rebecca L Kirschweng, Bloomfield Hills, MI (US); Takeshi Yoshida, Ann Arbor, MI (US); George M. Evans, Ann Arbor, MI (US); William Patrick Garrett, Plymouth, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 66 days.

(21) Appl. No.: 18/308,910

(22) Filed: Apr. 28, 2023

(65) Prior Publication Data
US 2024/0359694 A1  Oct. 31, 2024

(51) Int. Cl.
*B60W 40/08* (2012.01)
*B60W 50/16* (2020.01)
(Continued)

(52) U.S. Cl.
CPC ............ *B60W 40/08* (2013.01); *B60W 50/16* (2013.01); *G06V 20/59* (2022.01);
(Continued)

(58) Field of Classification Search
CPC ................ B60W 40/08; B60W 50/16; B60W 2050/143; B60W 2540/12; B60W 2540/223; G06V 20/59
See application file for complete search history.

(56) References Cited

U.S. PATENT DOCUMENTS

| 5,835,008 A | * | 11/1998 | Colemere, Jr. | ........ B60Q 1/441 340/576 |
| 6,023,227 A | * | 2/2000 | Yanko | .................... G08B 21/06 340/576 |

(Continued)

FOREIGN PATENT DOCUMENTS

CN         104924904 B      12/2017

*Primary Examiner* — Mohamed Barakat
(74) *Attorney, Agent, or Firm* — HAYNES AND BOONE, LLP

(57) ABSTRACT

A pedal touch anomaly notification system for a vehicle is provided. The system includes the vehicle itself, and at least one sensor configured to capture information about the position or orientation of the driver's foot relative to a control pedal of the vehicle. A processor uses the captured information, as well as a database containing baseline information and variance information about expected positions or orientations of the driver's foot relative to the control pedal. Based on the captured information, the processor determines the position or orientation of the foot of the driver relative to the control pedal, and compares the determined position or orientation to the baseline information and variance information. If the position or orientation fall outside the variance information, the processor generates a driver alert.

48 Claims, 10 Drawing Sheets

(51) Int. Cl.
*G06V 20/59* (2022.01)
*B60W 50/14* (2020.01)

(52) U.S. Cl.
CPC ... *B60W 2050/143* (2013.01); *B60W 2540/12* (2013.01); *B60W 2540/223* (2020.02)

(56) References Cited

U.S. PATENT DOCUMENTS

| | | |
|---|---|---|
| 9,120,375 B2 | 9/2015 | Byun et al. |
| 2013/0009761 A1* | 1/2013 | Horseman ............ A61B 5/6893 340/576 |
| 2018/0162415 A1* | 6/2018 | Song ..................... B60W 50/00 |
| 2019/0156150 A1* | 5/2019 | Krishnan ............... G06V 40/70 |
| 2019/0310679 A1* | 10/2019 | Golec .................... B62J 45/415 |
| 2020/0080851 A1* | 3/2020 | Edwards ............... G01C 21/343 |
| 2020/0231111 A1* | 7/2020 | Ghannam ............. H04N 23/45 |

* cited by examiner

SYSTEM FOR PROVIDING FEEDBACK BASED ON PEDAL TOUCHING

TECHNICAL FIELD

The subject matter described herein relates generally to improving the drivability of a vehicle and, more particularly, to apparatus, systems, and methods for providing real-time driver feedback based on foot position on a brake pedal. This technology has particular but not exclusive utility for consumer and commercial cars and trucks.

BACKGROUND

It is common for vehicles to provide cautionary feedback to a driver, such as seatbelt notifications, "door ajar" warnings, etc. Further, it is known in the prior art to provide cautionary feedback based on the way the driver is operating the vehicle. For example, a vehicle may provide artificial engine noises to drivers to bring their attention to the speed at which their vehicle is driving. Safe, consistent operation of the brake pedal is a particularly important aspect of safe driving.

The information included in this Background section of the specification is included for technical reference purposes only and is not to be regarded as subject matter by which the scope of the disclosure is to be bound.

SUMMARY

Touching habits for a brake pedal have significant safety implications, and can vary significantly in different circumstances. For example, when drivers wear different shoes, they have different levels of control over the vehicle pedals, e.g., a driver driving barefoot will not drive the same as when that same driver is wearing thick work boots. However, it is desirable for the driver to provide consistent control inputs or, where consistent control inputs are not possible, to at least be aware that their pedal touching habits fall outside of a normal range. Disclosed herein is a pedal touch anomaly notification system, a vehicle system capable of establishing baseline pedal touching characteristics of a driver, and of detecting and reporting pedal touching that falls outside the baseline. The pedal touch anomaly notification system has particular, but not exclusive, utility for improving the safety of consumer and commercial cars and trucks.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a pedal touch anomaly notification system for a vehicle. The pedal touch anomaly notification system includes the vehicle, and at least one sensor configured to capture information about a position or orientation of a foot of a driver of the vehicle relative to a control pedal of the vehicle. The system also includes a database storing baseline information and variance information about expected positions or orientations of the foot of the driver relative to the control pedal. The system also includes a processor with a memory configured to: based on the captured information, determine the position or orientation of the foot of the driver relative to the control pedal; compare the determined position or orientation to the baseline information and variance information; and if the position or orientation fall outside the variance information, generate a driver alert. Other embodiments of this aspect include corresponding computer systems, apparatus, and computer programs recorded on one or more computer storage devices, each configured to perform the actions of the methods.

Implementations may include one or more of the following features. In some embodiments, the position or orientation of the foot of the driver relative to the control pedal may include a position of the driver's foot on the control pedal. In some embodiments, the position or orientation of the foot of the driver relative to the control pedal may include a portion of the driver's foot on the control pedal. In some embodiments, the position or orientation of the foot of the driver relative to the control pedal may include an angle of an ankle of the driver In some embodiments, the at least one sensor is further configured to capture information about footwear of the driver, and the processor is further configured to: identify the footwear of the driver; and if the footwear of the driver appears on a list, stored in the database, of problematic footwear, generate the driver alert. In some embodiments, the at least one sensor is further configured to capture information about a clothing item of the driver, and the processor is further configured to: identify the clothing item of the driver; and if the clothing item of the driver appears on a list, stored in the database, of problematic clothing items, generate the driver alert. In some embodiments, the at least one sensor is further configured to capture information about a pedal deflection or pedal velocity of the control pedal, and where the processor is further configured to: compare the pedal deflection or pedal velocity to baseline pedal deflection or pedal velocity information and pedal deflection variance or pedal velocity variance stored in the database; and if the pedal deflection or pedal velocity falls outside the pedal deflection variance or pedal velocity variance, generate the driver alert. In some embodiments, the at least one sensor is further configured to capture information about a velocity, acceleration, or jerk of the vehicle, and the processor is further configured to: compare the velocity, acceleration, or jerk to baseline velocity, acceleration, or jerk information and velocity, acceleration, or jerk variance stored in the database; and if the velocity, acceleration, or jerk falls outside the velocity, acceleration, or jerk variance, generate the driver alert. In some embodiments, the driver alert may include a text alert or icon. In some embodiments, the driver alert may include an auditory or haptic alert. In some embodiments, the processor is configured to determine the position or orientation of the foot of the driver relative to the control pedal based on the captured information and deduced information. In some embodiments, the vehicle is configured to identify a specific driver, and the baseline information and variance information about expected positions or orientations of the foot of the driver relative to the control pedal is specific to the specific driver. In some embodiments, the processor is further configured to update, in the database, based on driving characteristics of the driver, the baseline information and variance information about expected positions or orientations of the foot of the driver relative to the control pedal. Implementations of the described techniques may include hardware, a method or process, or computer software on a computer-accessible medium.

One general aspect includes a pedal touch anomaly notification method for a vehicle. The pedal touch anomaly notification method includes, with at least one sensor, capturing information about a position or orientation of a foot of a driver of the vehicle relative to a control pedal of the vehicle. The method also includes, with a database, storing baseline information and variance information about expected positions or orientations of the foot of the driver relative to the control pedal. The method also includes, with a processor that includes a memory: based on the captured information, determining the position or orientation of the foot of the driver relative to the control pedal; comparing the determined position or orientation to the baseline information and variance information; and if the position or orientation fall outside the variance information, generating a driver alert. Other embodiments of this aspect include corresponding computer systems, apparatus, and computer programs recorded on one or more computer storage devices, each configured to perform the actions of the methods.

Implementations may include one or more of the following features. In some embodiments, the method may include: with the at least one sensor, capturing information about footwear of the driver; and with the processor: identifying the footwear of the driver; and if the footwear of the driver appears on a list, stored in the database, of problematic footwear, generating the driver alert. In some embodiments, the method may include: with the at least one sensor, capturing information about a clothing item of the driver; and with the processor: identify the clothing item of the driver; and if the clothing item of the driver appears on a list, stored in the database, of problematic clothing items, generating the driver alert. In some embodiments, the method may include: with the at least one sensor, capturing information about a pedal deflection or pedal velocity of the control pedal, and with the processor: comparing the pedal deflection or pedal velocity to baseline pedal deflection or pedal velocity information and pedal deflection variance or pedal velocity variance stored in the database; and if the pedal deflection or pedal velocity falls outside the pedal deflection variance or pedal velocity variance, generating the driver alert. In some embodiments, the method may include: with the at least one sensor, capturing information about a velocity, acceleration, or jerk of the vehicle, and with the processor: comparing the velocity, acceleration, or jerk to baseline velocity, acceleration, or jerk information and velocity, acceleration, or jerk variance stored in the database; and if the velocity, acceleration, or jerk falls outside the velocity, acceleration, or jerk variance, generating the driver alert. In some embodiments, the vehicle is configured to identify a specific driver, and the baseline information and variance information about expected positions or orientations of the foot of the driver relative to the control pedal is specific to the specific driver. In some embodiments, the method may include updating, in the database, based on driving characteristics of the driver, the baseline information and variance information about expected positions or orientations of the foot of the driver relative to the control pedal. Implementations of the described techniques may include hardware, a method or process, or computer software on a computer-accessible medium.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of pedal touch anomaly notification system, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

DETAILED DESCRIPTION

Figure 1:
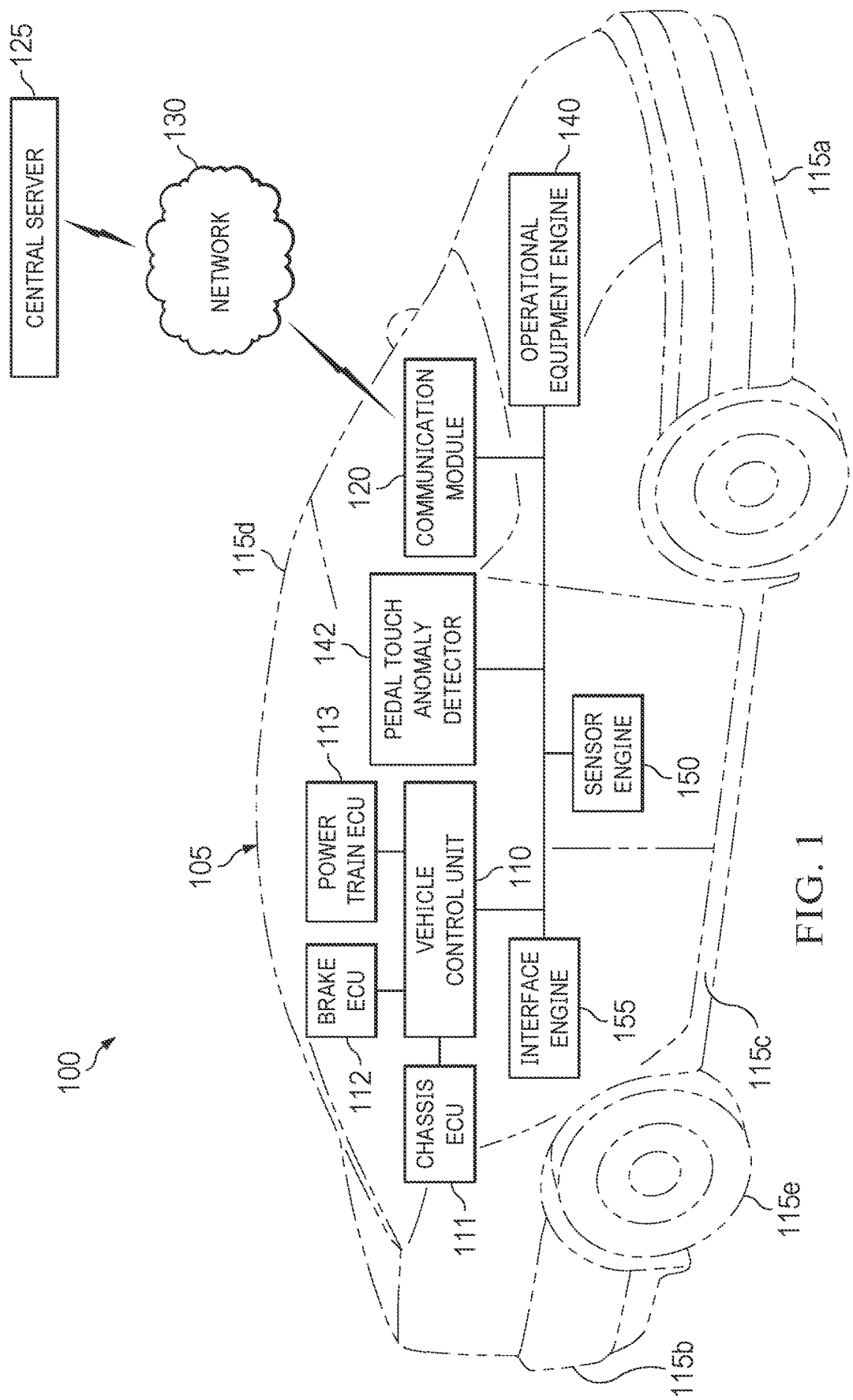
FIG. 1 is a diagrammatic illustration of a vehicle including a pedal touch anomaly notification system, in accordance with at least one embodiment of the present disclosure.

The present disclosure is generally directed to providing real-time feedback to a driver based on pedal touching habits, and particularly on atypical interactions between the driver and a brake pedal. It is not known in the prior art to provide feedback to the driver that brings the driver's attention to their pedal touching habits. Touching habits for a brake pedal have significant safety implications, and can vary significantly in different circumstances. For example, when drivers wear different shoes, they have different levels of control over the vehicle pedals, e.g., a driver driving barefoot will not drive the same as when that same driver is wearing thick work boots. However, it is desirable for the driver to provide consistent control inputs or, where consistent control inputs are not possible, to at least be aware that their pedal touching habits fall outside of a normal range.

Disclosed herein is a pedal touch anomaly notification system, a vehicle system capable of establishing baseline pedal touching characteristics of a driver, and of detecting and reporting pedal touching that falls outside the baseline. Baseline pedal touching characteristics may for example correspond to the way the driver uses the vehicle's pedals when they are wearing shoes with normal soles, such as sneakers or dress shoes. In future drives, if the driver's pedal touching differs from the baseline data, the system provides feedback to the driver in the form of tactile, auditory, visual, textual, symbolic, or other feedback to bring the driver's attention to their differing driver habits.

The system may also use imaging sensors to determine that the driver is wearing shoes that will result in different pedal touching before the driver begins to drive. In any case, when the system determines a discrepancy in the pedal touching habits of the driver, the system warns the driver to adjust how they are driving. For example, if a driver is wearing large work boots with thick soles and cannot feel the pedals as well as when the driver wears sneakers, the driver may be applying too much force to the pedals, causing the vehicle to drive more erratically. In such a case, the system can provide feedback to the driver, where the feedback suggests that the driver apply less force to the pedals.

The present disclosure aids substantially in ensuring the vehicle is safely operated, by improving the driver's awareness of pedal touching habits in real time. Implemented on a processor in communication with a variety of sensors, the pedal touch anomaly notification system disclosed herein provides practical feedback to the driver based on real-time conditions. This augmented driving awareness transforms a driving process where the driver's awareness of pedal touch is provided only through the acceleration and deceleration of the vehicle, into one where the driver receives feedback on their pedal touching habits before an anomalously large or anomalously small braking or acceleration event has a chance to occur. This benefit comes, without the normally routine need for the driver to consciously adjust their driving style to different footwear, clothing, and driving conditions such as traffic and weather. This unconventional approach improves the functioning of the vehicle, by providing information needed to improve the driving habits of the vehicle's operator.

The pedal touch anomaly notification system may be implemented as a process at least partially viewable on a display, and operated by a control process executing on a processor that accepts user inputs from the brake pedal and other control pedals, and that is in communication with one or more sensors. In that regard, the control process performs certain specific operations in response to different inputs or selections made at different times, and/or in response to real-time or near-real-time sensor readings. Certain structures, functions, and operations of the processor, display, sensors, and user input systems are known in the art, while others are recited herein to enable novel features or aspects of the present disclosure with particularity.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. It is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

These descriptions are provided for exemplary purposes, and should not be considered to limit the scope of the pedal touch anomaly notification system. Certain features may be added, removed, or modified without departing from the spirit of the claimed subject matter.

FIG. 1 is a diagrammatic illustration of a pedal touch anomaly notification system in accordance with at least one embodiment of the present disclosure. In an example, a pedal touch anomaly notification system is referred to by the reference numeral 100 and includes a vehicle 105, such as an automobile, and a vehicle control unit 110 located on the vehicle 105. The vehicle 105 may include a front portion 115a (including a front bumper), a rear portion 115b (including a rear bumper), a right side portion 115c (including a right front quarter panel, a right front door, a right rear door, and a right rear quarter panel), a left side portion 115d (including a left front quarter panel, a left front door, a left rear door, and a left rear quarter panel), and wheels 115e. A communication module 120 is operably coupled to, and adapted to be in communication with, the vehicle control unit 110. The communication module 120 is adapted to communicate wirelessly with a central server 125 via a network 130 (e.g., a 3G network, a 4G network, a 5G network, a Wi-Fi network, or the like). The central server 125 may provide information and services including but not limited to include location, mapping, route or path, and topography information.

An operational equipment engine 140 is operably coupled to, and adapted to be in communication with, the vehicle control unit 110. A sensor engine 150 is operably coupled to, and adapted to be in communication with, the vehicle control unit 110. The sensor engine 150 is adapted to monitor various components of, for example, the operational equipment engine 140, as will be described in further detail below. An interface engine 155 is operably coupled to, and adapted to be in communication with, the vehicle control unit 110. In addition to, or instead of, being operably coupled to, and adapted to be in communication with, the vehicle control unit 110, the communication module 120, the operational equipment engine 140, the sensor engine 150, and/or the interface engine 155 may be operably coupled to, and adapted to be in communication with, another of the components via wired or wireless communication (e.g., via an in-vehicle network). In some examples, the vehicle control unit 110 is adapted to communicate with the communication module 120, the operational equipment engine 140, the sensor engine 150, and the interface engine 155 to at least partially control the interaction of data with and between the various components of the pedal touch anomaly notification system 100.

The term "engine" is meant herein to refer to an agent, instrument, or combination of either, or both, agents and instruments that may be associated to serve a purpose or accomplish a task-agents and instruments may include sensors, actuators, switches, relays, power plants, system wiring, computers, components of computers, programmable logic devices, microprocessors, software, software routines, software modules, communication equipment, networks, network services, and/or other elements and their equivalents that contribute to the purpose or task to be accomplished by the engine. Accordingly, some of the engines may be software modules or routines, while others of the engines may be hardware and/or equipment elements in communication with any or all of the vehicle control unit 110, the communication module 120, the network 130, or a central server 125.

In this example, the vehicle 105 also includes a chassis electronic control unit (ECU) 111 which controls elements of the vehicle's suspension system, a brake ECU 112 which controls the braking system or elements thereof, a power train ECU 113 (variously known as an engine ECU, power plant ECU, motor ECU, or transmission ECU) that controls elements of the motor 195 and drivetrain 200, sensor engine 150, and a pedal touch anomaly detector 142, the operation of which will be described below.

A reader of ordinary skill in the art will understand that other components or arrangements of components may be found in a vehicle 105, and that the same general principles apply to electric vehicles, internal combustion vehicles, and hybrid vehicles. For example, a power train ECU 113 may control both motor and transmission components. Alternatively, a separate motor ECU and transmission ECU may exist, or some functions of a motor ECU or transmission ECU may be performed by the VCU 110.

Figure 2:
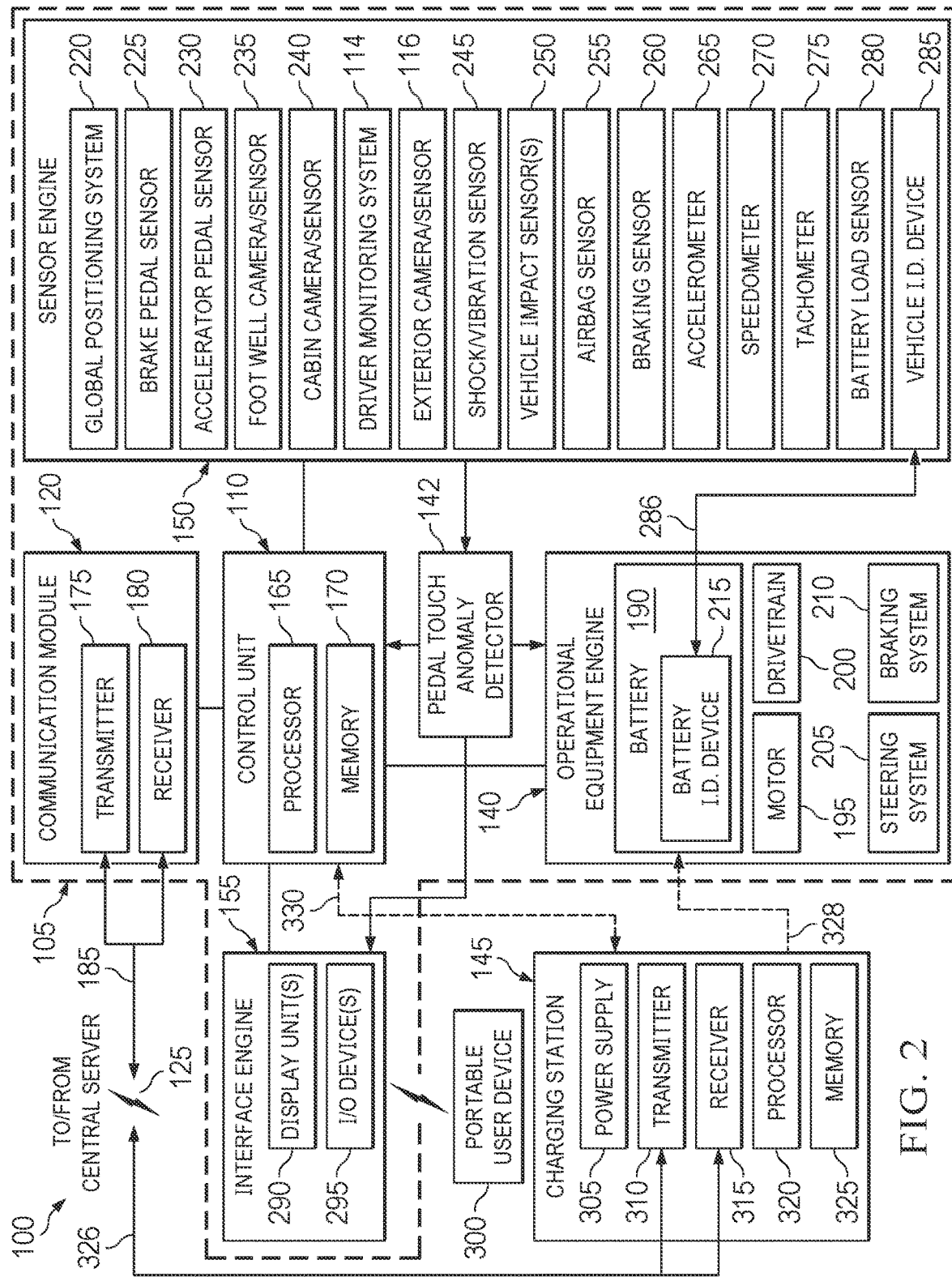
FIG. 2 is a diagrammatic illustration, in a block-diagram form, of at least a portion of the pedal touch anomaly notification system of FIG. 1, in accordance with at least one embodiment of the present disclosure.

FIG. 2 is a diagrammatic illustration, in a block-diagram form, of at least a portion of the pedal touch anomaly notification system 100 of FIG. 1, in accordance with at least one embodiment of the present disclosure. It is worth noting that the components of the vehicle 105 may be located either permanently or temporarily as a part of the vehicle 105. The vehicle control unit (VCU) 110 includes a processor 165 and a memory 170. In some examples, the communication module 120, which is operably coupled to, and adapted to be in communication with, the vehicle control unit 110, includes a transmitter 175 and a receiver 180. In some examples, one or the other of the transmitter 175 and the receiver 180 may be omitted according to the particular application for which the communication module 120 is to be used. In other examples, the transmitter 175 and receiver 180 are combined into a single transceiver that performs both transmitting and receiving functions.

In some examples, the operational equipment engine 140, which is operably coupled to, and adapted to be in communication with, the vehicle control unit 110, includes a plurality of devices configured to facilitate driving of the vehicle 105. In this regard, the operational equipment engine 140 may be designed to exchange communication with the vehicle control unit 110, so as to not only receive instructions, but to provide information on the operation of the operational equipment engine 140. For example, the operational equipment engine 140 may include a vehicle battery 190, a motor 195, a drivetrain 200, a steering system 205, and a braking system 210. In some vehicles, the vehicle battery 190 may provide electrical power to the motor 195 to drive the wheels 115e of the vehicle 105 via the drivetrain 200. In some examples, instead of or in addition to providing power to the motor 195 to drive the wheels 115e of the vehicle 105 via the drivetrain or transmission 200, the vehicle battery 190 provides electrical power to another component of the operational equipment engine 140, the vehicle control unit 110, the communication module 120, the sensor engine 150, the interface engine 155, or any combination thereof. In some examples, the vehicle battery 190 includes a battery identification device 215. The battery identification device 215 is adapted to communicate with one or more components of the sensor engine 150, and stores data identifying the vehicle battery 190 such as, for example, manufacturing information (e.g., production date, production facility, etc.), battery characteristic(s) information, battery identification number information, electric vehicle compatibility information, or the like. In some embodiments, the motor is an internal combustion motor and the battery operates a starter.

In some examples, the sensor engine 150, which is operably coupled to, and adapted to be in communication with, the vehicle control unit 110, includes devices such as sensors, meters, detectors, or other devices configured to measure or sense a parameter related to a driving operation of the vehicle 105. For example, the sensor engine 150 may include a global positioning system 220 that can be used to determine road grade, a brake pedal sensor 225, an accelerator pedal sensor 230, a foot well camera or sensor 235 that can be used to determine the pose of a driver's lower leg and foot, cabin camera or sensor 240 that can be used to determine the pose of a driver's upper leg and lower leg, a shock/vibration sensor 245, a vehicle impact sensor 250, an airbag sensor 255, a braking sensor 260, an accelerometer 265 (which may in some cases also serve as an inclinometer), a speedometer 270, a tachometer 275, a battery load sensor 280, a vehicle identification device 285, a driver monitoring system 114 that can be used to track the identity and limb positions/angles of the driver, an exterior camera or sensor 116 that can be used to monitor traffic and/or weather conditions around the vehicle, or any combinations thereof. In some instances, traffic or weather patterns may be monitored from outside the vehicle and received from a server via a network.

The sensors or other detection devices may be configured to sense or detect activity, conditions, and circumstances in an area to which the device has access, e.g., ambient conditions, conditions within the vehicle cabin, conditions within the driver's side foot well, etc., Sub-components of the sensor engine 150 may be deployed at any operational area where information on the driving of the vehicle 105 may occur. Some readings from the sensor engine 150 may be fed back to the vehicle control unit 110. Stored and reported performance data may include the sensed data, or may be derived, calculated, or inferred from sensed data. The vehicle control unit 110 may send signals to the sensor engine 150 to adjust the calibration or operating parameters of the sensor engine 150 in accordance with a control program in the vehicle control unit 110. The vehicle control unit 110 is adapted to receive and process performance data from the sensor engine 150 or from other suitable source(s), and to monitor, store (e.g., in the memory 170), and/or otherwise process (e.g., using the processor 165) the received performance data.

The braking sensor 260 is adapted to monitor usage of the vehicle 105's braking system 210 (e.g., an antilock braking system 210) and to communicate the braking information to the vehicle control unit 110. The accelerometer 265 is adapted to monitor acceleration of the vehicle 105 and to communicate the acceleration information to the vehicle control unit 110. The accelerometer 265 may be, for example, a two-axis accelerometer 265 or a three-axis accelerometer 265, and may also serve as an inclinometer or tilt sensor. In some examples, the accelerometer 265 is associated with an airbag of the vehicle 105 to trigger deployment of the airbag. The speedometer 270 is adapted to monitor speed of the vehicle 105 and to communicate the speed information to the vehicle control unit 110. In some examples, the speedometer 270 is associated with a display unit of the vehicle 105 such as, for example, a display unit of the interface engine 155, to provide a visual indication of vehicle speed to a driver of the vehicle 105. The tachometer 275 is adapted to monitor the working speed (e.g., in revolutions-per-minute) of the vehicle 105's motor 195 and to communicate the angular velocity information to the vehicle control unit 110. In some examples, the tachometer 275 is associated with a display unit of the vehicle 105 such as, for example, a display unit of the interface engine 155, to provide a visual indication of the motor 195's working speed to the driver of the vehicle 105. The battery load sensor 280 is adapted to monitor charging, discharging, and/or overcharging of the vehicle battery 190 and to communicate the charging, discharging, and/or overcharging information to the vehicle control unit 110.

In some examples, the vehicle identification device 285 stores data identifying the vehicle 105 such as, for example, manufacturing information (e.g., make, model, production date, production facility, etc.), vehicle characteristic(s) information, vehicle identification number ("VIN") information, battery compatibility information, or the like. The vehicle identification device 285 is adapted to communicate with the battery identification device 215 (or vice versa), as indicated by arrow 286. In some examples, the vehicle identification device 285 and the battery identification device 215 may each communicate with the vehicle control unit 110.

In some examples, the interface engine 155, which is operably coupled to, and adapted to be in communication with, the vehicle control unit 110, includes at least one input and output device or system that enables a user to interact with the vehicle control unit 110 and the functions that the vehicle control unit 110 provides. For example, the interface engine 155 may include a display unit 290 and an input/output ("I/O") device 295. The display unit 290 may be, include, or be part of multiple display units. In some examples, the display unit 290 may include one, or any combination, of a central display unit associated with a dash of the vehicle 105, an instrument cluster display unit associated with an instrument cluster of the vehicle 105, and/or a heads-up display unit associated with the dash and a windshield of the vehicle 105; accordingly, as used herein the reference numeral 290 may refer to one, or any combination, of the display units. The I/O device 295 may be, include, or be part of a communication port (e.g., a USB port), a Bluetooth communication interface, a touch-screen display unit, soft keys associated with a dash, a steering wheel, or another component of the vehicle 105, and/or similar components. Other examples of sub-components that may be part of the interface engine 155 include, but are not limited to, audible alarms, visual alerts, telecommunications equipment, and computer-related components, peripherals, and systems.

In some examples, a portable user device 300 belonging to an occupant of the vehicle 105 may be coupled to, and adapted to be in communication with, the interface engine 155. For example, the portable user device 300 may be coupled to, and adapted to be in communication with, the interface engine 155 via the I/O device 295 (e.g., the USB port and/or the Bluetooth communication interface). In an example, the portable user device 300 is a handheld or otherwise portable device which is carried onto the vehicle 105 by a user who is a driver or a passenger on the vehicle 105. In addition, or instead, the portable user device 300 may be removably connectable to the vehicle 105, such as by temporarily attaching the portable user device 300 to the dash, a center console, a seatback, or another surface in the vehicle 105. In another example, the portable user device 300 may be permanently installed in the vehicle 105. In some examples, the portable user device 300 is, includes, or is part of one or more computing devices such as personal computers, personal digital assistants, cellular devices, mobile telephones, wireless devices, handheld devices, laptops, audio devices, tablet computers, game consoles, cameras, and/or any other suitable devices. In several examples, the portable user device 300 is a smartphone such as, for example, an iPhone® by Apple Incorporated.

The pedal touch anomaly notification system 100 also includes a pedal touch anomaly detector 142, the operation of which will be described below. In some embodiments, the pedal touch anomaly detector 142 comprises a standalone housing with its own processor and memory. In other embodiments, the acceleration compensation engine exists as software, firmware, or hardware within another processor, such as the vehicle control unit 110, operational equipment engine 140, or brake ECU 112. The pedal touch anomaly detector 142 may be in communication with one or more of the sensor engine 150, VCU 110, operational equipment engine 140, or interface engine 155.

The sensor engine 150 includes environmental sensors and vehicle sensors.

A reader of ordinary skill in the art will understand that other components or arrangements of components may be found in a vehicle 105, and that may of the same general principles apply to electric vehicles, internal combustion vehicles, and hybrid vehicles.

Figure 3:
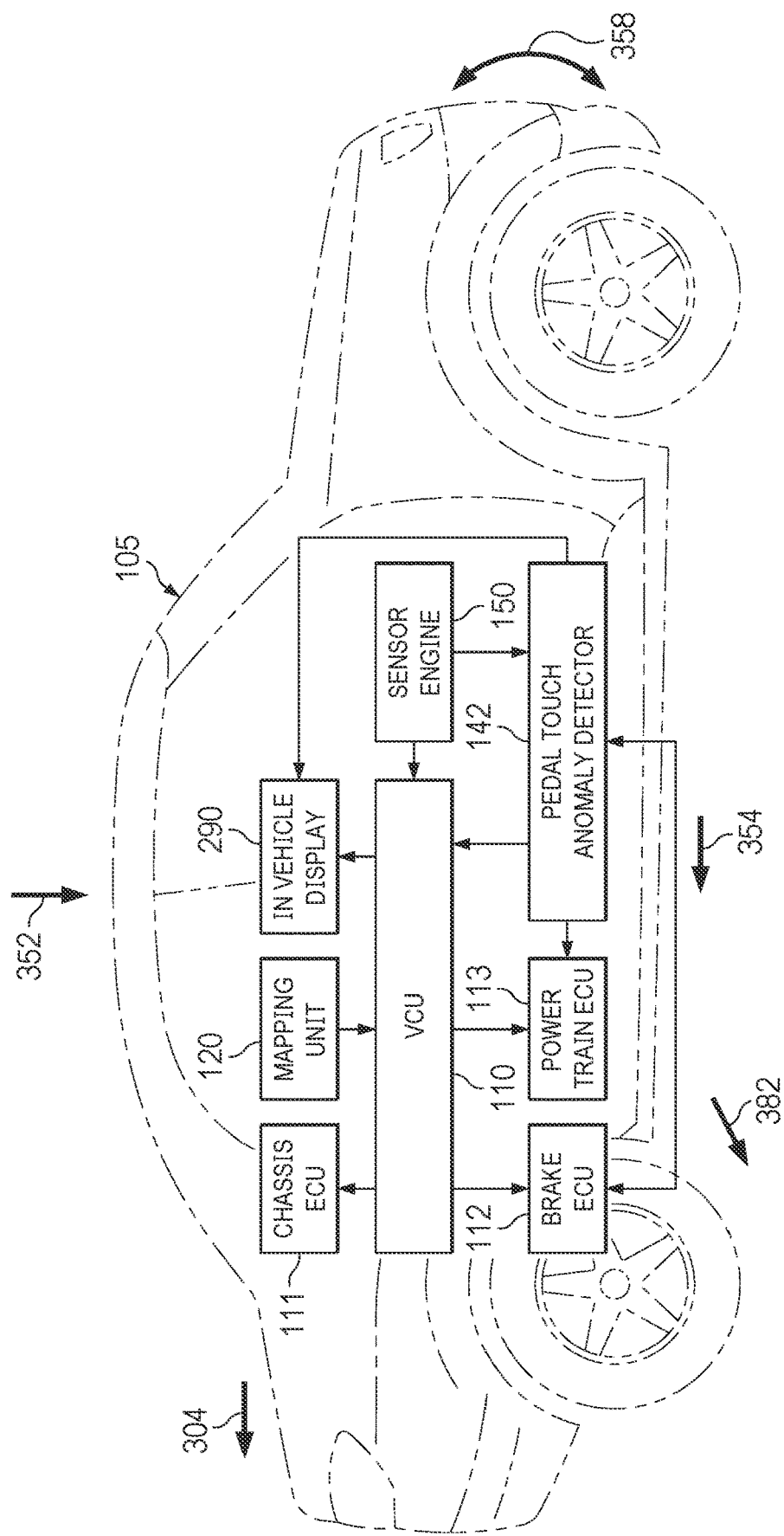
FIG. 3 is an exemplary diagrammatic illustration of the pedal touch anomaly notification system embodied as a vehicle, in accordance with at least one embodiment of the present disclosure.

FIG. 3 is an exemplary diagrammatic illustration of the pedal touch anomaly notification system 100 embodied as a vehicle 105 in accordance with at least one embodiment of the present disclosure. In this implementation, for clarity, only certain engines, systems, and components are shown. However, other engines, systems, and components, including those describe herein, are also contemplated as being a part of the pedal touch anomaly notification system 100 shown in FIG. 3. In this example, within the vehicle 105 the VCU 110 receives information from a sensor engine 150, which receives information from environmental sensors and vehicle sensors. In addition, the VCU 110 sends information to the chassis ECU 111, brake ECU 112, power train ECU 113, and in-vehicle display 290.

Force variables that may be incorporated into physics calculations within the VCU 110, pedal touch anomaly detector 142, or other engines include but are not limited to the vehicle absolute weight 352, vehicle rolling friction 354, vehicle aerodynamic drag 304, and vehicle pitch 358. In some examples, each of these variables is a force that may be expressed in lbf, Newtons, degrees, or any other unit as needed. In an example, the vehicle pitch 358 is stored within the memory 170 of the Vehicle Control Unit 110, and is calculated based on data from the accelerometer 265 to provide a sensed acceleration, and the first derivative of the vehicle speed 270 from the speedometer 270 to provide an acceleration value tangent or parallel to the road surface. The difference between these two acceleration vectors can indicate vehicle pitch 358. Vehicle pitch may also be measured with an inclinometer or geomagnetometer.

Other variables may not be directly known, but may be estimated from graphs, curves, or lookup tables for a nominal vehicle (e.g., vehicle weight 352, vehicle rolling friction 354, and vehicle aerodynamic drag 304). Some variables may be calculated or estimated from performance variables that normally exist within the VCU 110. For example, the combined mass, gross weight, or inertia of the vehicle 105 may be determined from the acceleration profile of the vehicle given a known force imparted by the motor 195 and drivetrain 200, and the Newtonian relationship $F=ma$. The mass of the carried load may then be estimated by subtracting a nominal or expected vehicle mass (e.g., stock weight or stock mass). Alternatively, if the road grade is known (e.g., from GPS data), the combined vehicle and carried load mass may be estimated based on the work or energy required for the operational equipment engine to push the vehicle uphill, or the force required hold it from rolling backward.

The total drag on the vehicle can be calculated based on the power output required to maintain a particular vehicle speed 270, and the sum of nominal or estimated values of the vehicle rolling friction 354 and aerodynamic drag 304. The ratio of aerodynamic drag to rolling friction can be estimated from known relationships for typical vehicles, or by other methods. The grade of the road or ground surface under the vehicle may be calculated from accelerometers, or may be calculated or taken directly from stored maps, GPS data or other indicators. The combination of vehicle weight 352, vehicle aerodynamic drag 304, and vehicle rolling friction 354 can be used to compute a vehicle rolling resistance vector 382 (e.g., as a vector sum of the force vectors). Histories, time averages, first derivatives, integrals, or filters of any of the aforementioned variables, along with known, anticipated, or estimated future values for some or all of the variables may also be incorporated into the physics calculations to improve or refine the results of the calculations. Accelerator pedal position may also be incorporated as being proportional to an expected power output from the motor 195.

The pedal touch anomaly notification system 100 also includes a pedal touch anomaly detector 142, which accepts inputs from the sensor engine (e.g., inputs from the GPS 220, brake pedal sensor 225, accelerator pedal sensor 230, exterior camera or sensor 116, accelerometer 265, and speedometer 270) and provides outputs, for example, to the in-vehicle display 290.

Figure 4A:
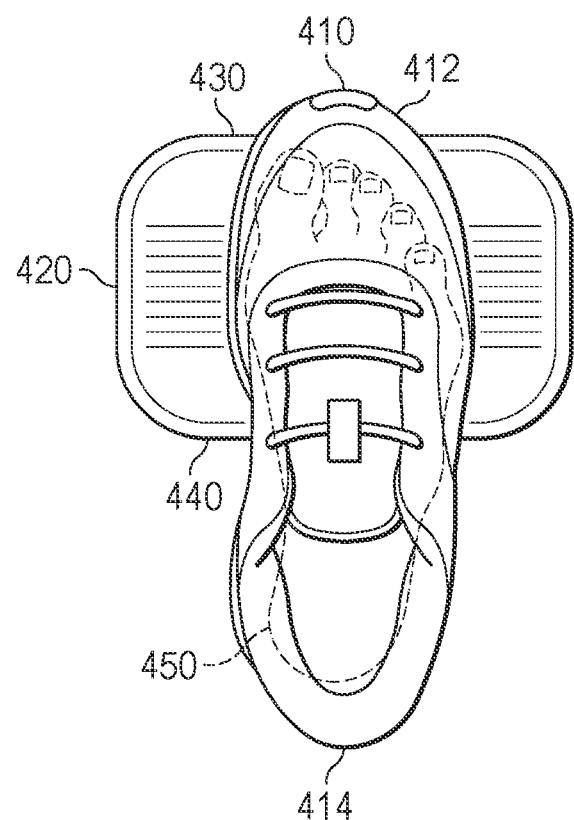
FIG. 4A is a schematic, diagrammatic representation of the placement of a driver's foot on a brake pedal, in accordance with at least one embodiment of the present disclosure.

FIG. 4A is a schematic, diagrammatic representation of the placement of a driver's foot 450 on a brake pedal 420, in accordance with at least one embodiment of the present disclosure. When a driver foot 450 is wearing a shoe 410, the foot 450 may be placed such that the front end 412 of the shoe 410 extends forward past a front edge 430 of the brake pedal 420, and also such that the rear end 414 of the shoe 410 extends rearward past the rear edge 440 of the brake pedal 420. This may, for some drivers, be considered a "normal" foot placement.

In some aspects, an ideal foot placement may be when the foot is completely on the pedal and not hanging over/extending past an edge of the pedal. In such aspects, detecting that the foot extends past the pedal is an object of the present disclosure. However, it is noted that different foot placements may be normal for different drivers, and thus an object of the present disclosure is to detect foot placement (or pedal force application) that is abnormal for each person, on an individual basis. However, if the normal placement of a person's foot is abnormal compared to the general average for all drivers, this may also be important information that can inform the machine learning algorithm and can, in some embodiments, be used to make foot placement recommendations to the driver.

Figure 4B:
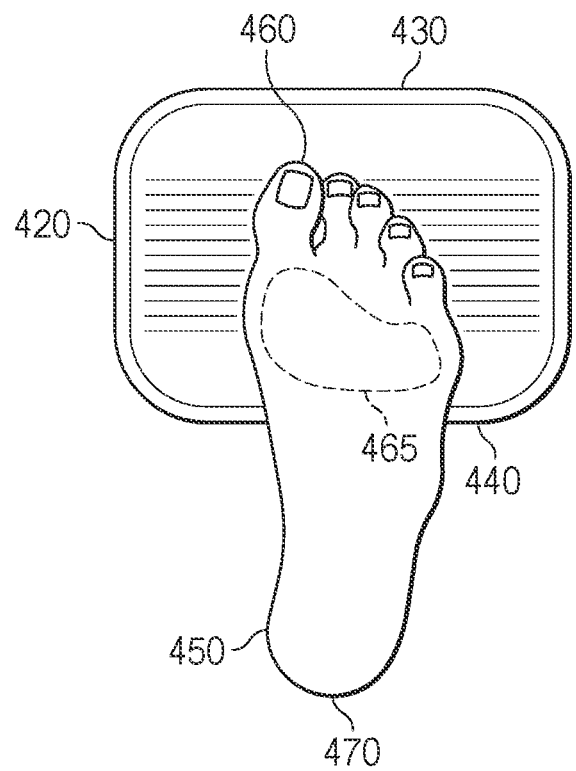
FIG. 4B is a schematic, diagrammatic representation of the placement of a driver's foot on a brake pedal, in accordance with at least one embodiment of the present disclosure.

FIG. 4B is a schematic, diagrammatic representation of the placement of a driver's foot 450 on a brake pedal 420, in accordance with at least one embodiment of the present disclosure. When a driver foot 450 is bare, the foot 450 may be placed differently than when the foot is wearing a shoe. In the example shown in FIG. 4B, the foot 450 is placed such that the toe tips 460 and ball 465 of the foot 450 are placed on the brake pedal 420 itself, and do not extend beyond the front edge 430 of the brake pedal 420, and also such that the heel 470 of the foot 450 extends rearward well past the rear edge 440 of the brake pedal 420. This may, for some drivers, be considered an abnormal or anomalous foot placement in comparison to their normal foot placement. Such placement may be problematic for several reasons. First, the change in foot placement can occur with a change in knee and ankle bend angles, with a resulting change in leverage generated by the leg muscles. Second, the change in foot placement can change the force distribution on the brake pedal 420 itself. Third, because the bare foot 450 is more sensitive to pressure and texture than a foot inside of a shoe, the driver may tend to press the brake pedal with less force than in the example shown in FIG. 4A. In an example, when the driver is barefoot, the heel may be lower and more rearward than when the driver is wearing a shoe, and the ball of the foot might not reach the pedal sufficiently to apply the brakes. In this case, the driver may lift the foot and heel to try to center the ball of foot on the pedal, but without an anchor point (e.g., contact between the heel and the floor of the cabin). Thus, bare foot placement may exhibit considerably more variance (too low, too high/forward, etc.) than shoe placement does, both for a particular driver and across all drivers generally.

For at least these reasons, driving barefoot can cause the driver to command less braking power than intended from the brake pedal 420, potentially leading to a safety concern. A similar (though often lesser) effect occurs when the driver is wearing socks, sandals, flip-flops, pool shoes, or high-heeled shoes, and an opposite effect (e.g., placing the foot even farther forward and commanding more braking power than intended) can occur when the driver is wearing heavy footgear such as hiking boots, construction boots, ski boots, etc. Thus, to detect an anomalous foot placement, the pedal touch anomaly notification system may compare a driver's foot placement to both an average placement across all drivers and a normal placement for that particular driver.

An object of the present disclosure is to provide devices, systems, and methods for warning the driver of abnormal foot placement or pedal force application, before an anomalously strong or anomalously weak braking event occurs. Although most examples given in this application refer to the brake pedal, it is noted that the same principles apply to other control pedals, including but not limited to the accelerator pedal, emergency brake pedal, and/or clutch pedal.

Figure 5:
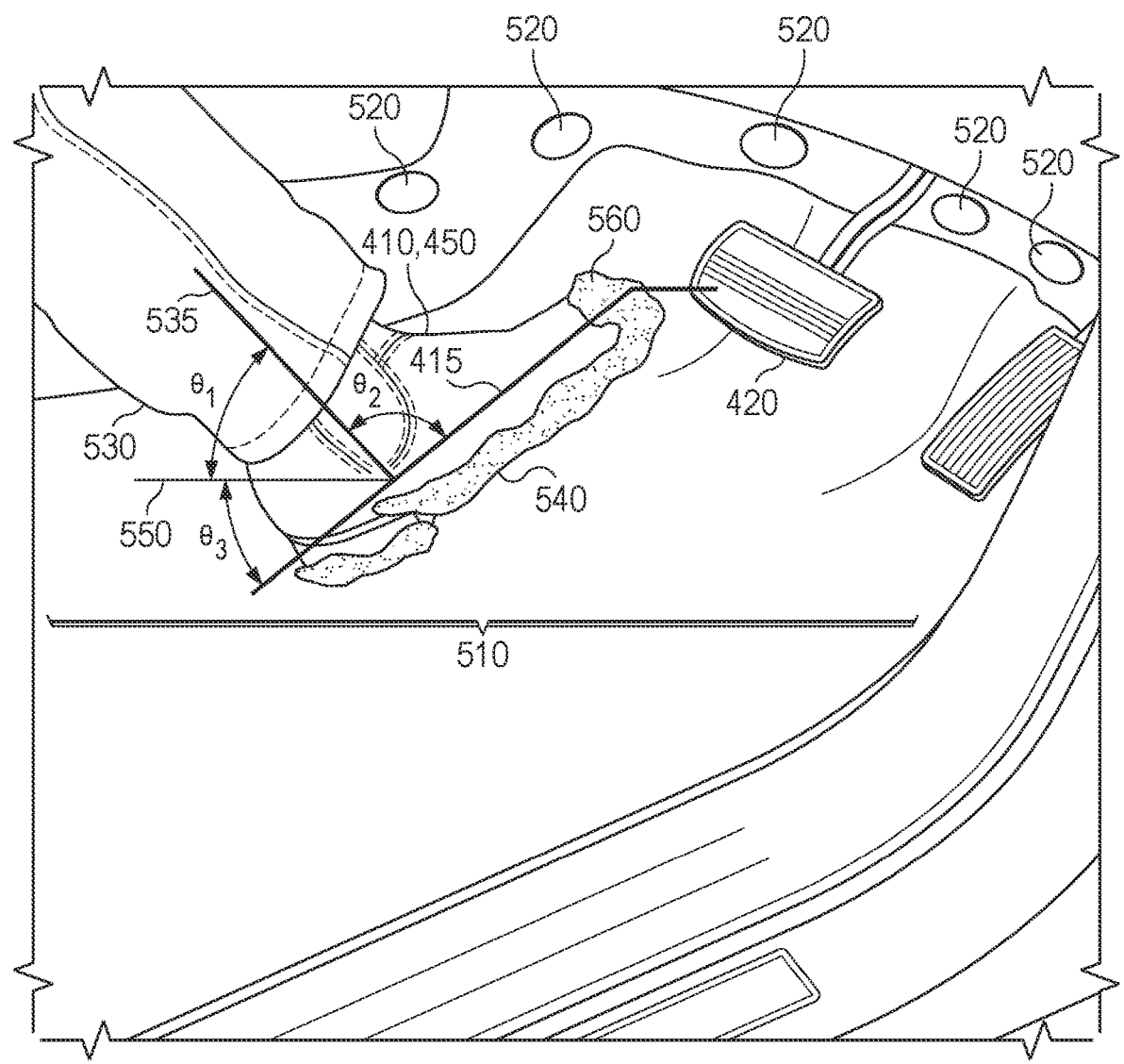
FIG. 5 is a schematic, diagrammatic representation of a driver's foot and shoe interacting with a brake pedal within the foot well of an example vehicle, in accordance with at least one embodiment of the present disclosure.

FIG. 5 is a schematic, diagrammatic representation of a driver's foot 450 and shoe 410 interacting with a brake pedal 420 within the foot well 510 of an example vehicle, in accordance with at least one embodiment of the present disclosure. In the example shown in FIG. 5, the driver's shoe 410 is a fairly heavy work shoe and is covered in mud 560, which can reduce the driver's ability to feel the brake pedal with a normal level of sensitivity. However, the shoe has a relatively flat sole 540, which can improve a driver's ability to place the shoe 410 accurately and consistently on the brake pedal 420.

The driver's foot 450 is inside the shoe 410. A center line 535 of the driver's lower leg 530 forms an angle $\theta 1$ with a horizontal plane 530. This may be referred to as a lower leg angle. Similarly, a reference line 415 of the driver's shoe 410 (e.g., parallel to the sole 540 of the shoe 410) forms an angle $\theta 2$ with the lower leg, which may for example be referred to as an ankle angle. The reference line 415 of the driver's shoe 410 also forms an angle $\theta 3$ with the horizontal plane 550.

In the example shown in FIG. 5, angles $\theta 1$, $\theta 2$, and $\theta 3$ can be measured or estimated by a processor or software module (e.g., the pedal touch anomaly detector 142 of FIGS. 1-3) in communication with one or more foot well sensors 520 (e.g., imaging sensors, point cloud depth sensors, or otherwise)

located within or proximate to the foot well 510, or else located outside the foot well 510 but able to view objects within the foot well 510.

It is noted that some drivers may operate the pedals of a vehicle using only the right foot, while other drivers may operate the vehicle using only the left foot, and still others may operate the vehicle using both feet. Any change from a driver's normal foot usage may be considered an anomaly.

Figure 6:
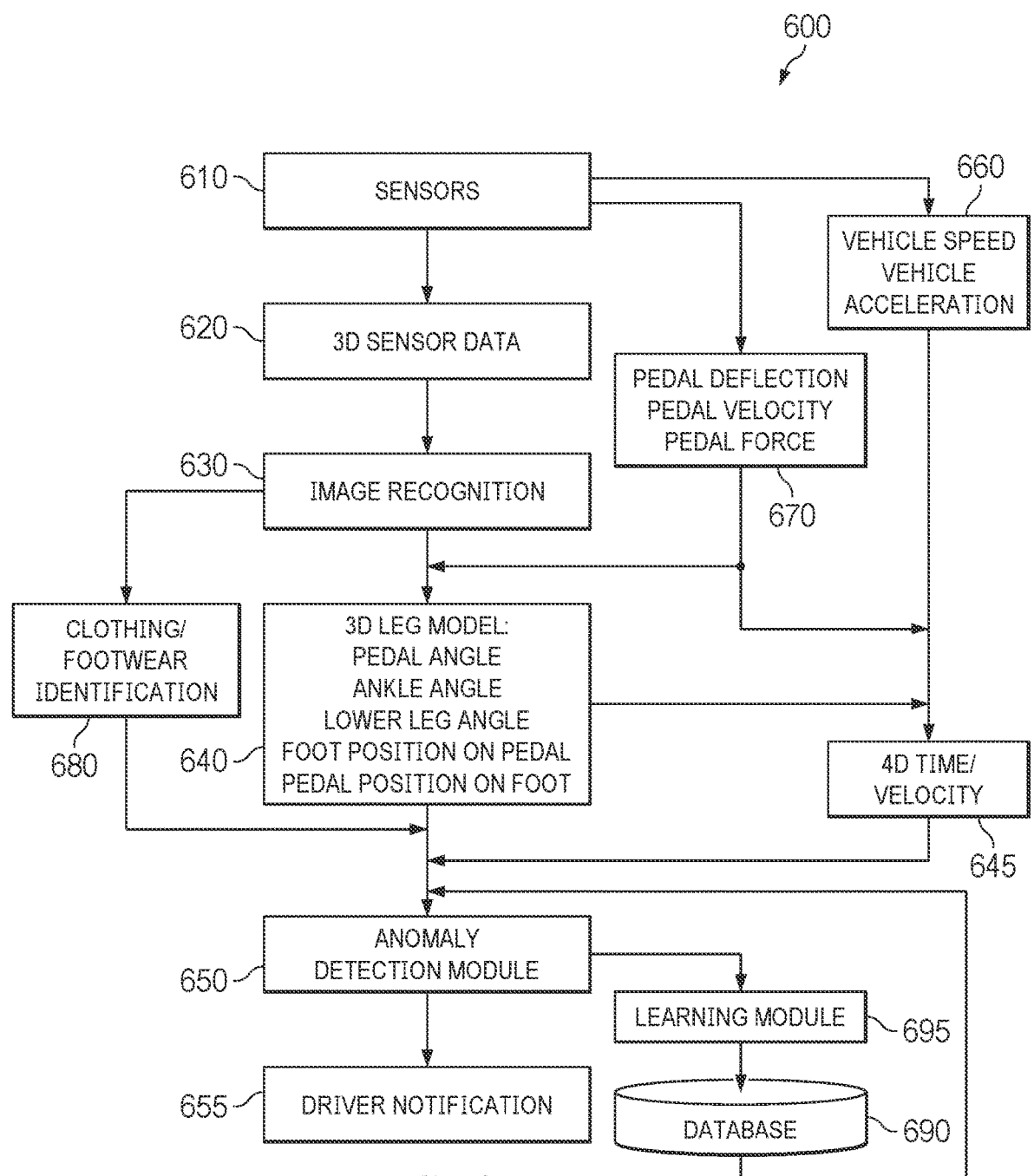
FIG. 6 shows a schematic representation, in block diagram form, of at least a portion of an example pedal touch anomaly notification system, in accordance with at least one embodiment of the present disclosure.

FIG. 6 shows a schematic representation, in block diagram form, of at least a portion of an example pedal touch anomaly notification system 100, in accordance with at least one embodiment of the present disclosure. In the example shown in FIG. 6, the block diagram 600 of the pedal touch anomaly notification system 100 shows sensors 610 generating 3D sensor data 620 which is received my an image recognition module 630. The image recognition model may for example determine angles θ1, θ2, and/or θ3 as shown in FIG. 5, and/or other measurements that form at least a portion of a 3D leg model 640.

Sensors 610 may also determine the brake pedal condition 670 (e.g., deflection of the brake pedal or the force applied to the brake pedal), from which a pedal angle can be derived. Thus, the 3D leg model 640 may include such parameters as pedal angle, ankle angle, lower leg angle, foot position on pedal (e.g., in an X-Y coordinate system centered on the pedal), and pedal position on foot (e.g., in an X-Y coordinate system centered on the foot). The 3D leg model 640 is received by an anomaly detection module 650. The brake pedal condition 670 may also be received by the anomaly detection module 650.

The image recognition model may also include, or pass data to, a clothing identification module or footwear identification module 680. The clothing/footwear identification nodule may for example identify clothing items that can interfere with the accurate measurement of leg geometry. For example, tall boots may interfere with accurate measurement of ankle angle, whereas long skirts, snow pants, and other clothing items may interfere with accurate measurement of lower leg angle. In addition, certain footgear may inherently affect pedal touching habits. These may for example include ski boots, heavy work boots, muddy boots or shoes, etc., which may tend to be placed farther forward on the brake pedal than lighter footgear such as sneakers or dress shoes, and may tend to decrease the sensitivity of the driver's foot to pedal touching. Similarly, bare feet, flip-flops, sandals, or high-heeled shoes may tend to be placed farther back on the brake pedal, and may tend to increase the sensitivity of the foot to pedal touching. Any footwear or clothing associated with anomalous pedal touching habits can then be reported to the anomaly detection module 650, and compared against a list of problematic clothing items stored in the database 690 (e.g., a list of clothing items known or suspected to affect pedal touching habits).

Some of the sensors 610 may also be used to determine vehicle speed and acceleration 660, which may be reported directly to the anomaly detection module 650 and/or have its history analyzed by a 4D time/velocity module 645 which may, for example, determine the current rate of change (e.g., first derivative) of vehicle acceleration (also referred to as "jerk", which is reflective of the driver's pedal touching habits on the brake and accelerator pedals). This value may then be reported to the anomaly detection module 650. The 4D time/velocity module 645 may also receive information from the 3D leg model so that, for example, a rate of change of ankle angle or lower leg angle can be reported to the anomaly detection module 650.

In some embodiments, the anomaly detection module 650 may for example be a simple filter or expert system that receives, from a database 690, baseline mean values and tolerances or variances for each of the input variables the anomaly detection module 650 receives from the other modules, such that any variable (e.g., "jerk", velocity of the brake pedal, or rate of change of ankle angle) that exceeds its upper or lower tolerance is flagged as an anomaly. In other embodiments, the anomaly detection module 650 may be or may include a machine learning (ML) model that, through a training process, has determined weights for each of the input variables it receives from the other modules, and that produces, as an output, a Yes/No anomaly detection flag. In either case, if the anomaly detection module 650 detects an anomaly, the anomaly detection module 650 issues a driver notification 655.

In some embodiments, the driver notification 655 may for example be or include a text notification or warning icon displayed on a dashboard, head unit, or head-up display. In other embodiments, the driver notification 655 may be or include a verbal warning, an audible tone, a haptic feedback such as vibration of the brake pedal or steering wheel, or other type of feedback known in the art.

In some embodiments, the anomaly detection module 650 reports to a learning module 695. This reporting may include not only Yes/No anomaly flags generated by the anomaly detection module 650 but also some or all of the input variables used to generate the flag. This may be done for example so that if the vehicle's driver has a distinctive driving style, the mean values, upper and lower tolerances, or weights associated with the respective input variables can be adjusted to account for this style while still detecting anomalies, e.g., significant deviations from this style.

It is also noted that different drivers may have different driving habits from one another, so that, for example, if a driver monitoring system 114 (see FIG. 2) detects Driver A, the anomaly detection module 650 may use one set of means, tolerances, or weights tailored to that driver, whereas if the driver monitoring system 114 detects Driver B, the anomaly detection module 650 may use a different set of baseline means, tolerances, or weights appropriate for Driver B.

It is noted that leg and ankle angles throughout the motion of a pedal press can be affected by other factors than those shown in FIG. 6. These factors may include static variables including but not limited to seat height above the pedals, seat pitch, seat longitudinal position, pedal height from floor, pedal face angle, whether the heel is touching the floor, and overall driver posture. These factors may also include dynamic variables including but not limited to pedal stroke angle, pedal stroke and distance, and longitudinal/latitudinal foot translation. In addition, pedal usage may be different in emergency situations than in non-emergency situations. For example, non-emergency braking often occurs with the heel of the foot placed on the floor of the cabin, whereas emergency braking often occurs without the heel on the floor. Additionally, the placement of a foot on a pedal at initial contact may change as the pedal is depressed. For example, foot placement when the brake is in the OFF position (e.g., not depressed) may be different than when the brake is in the ON position (e.g., partially or fully depressed). This change in position over time can also be tracked and compared against in the baseline. Thus, such static and dynamic variables may serve as additional inputs to the ML model.

It is noted that block diagrams included herein may show a particular arrangement of components, modules, services, steps, processes, or layers, resulting in a particular data flow. It is understood that some embodiments of the systems or methods disclosed herein may include additional components, that some components shown may be absent from some embodiments, and that the arrangement of components may be different than shown, resulting in different data flows while still performing the methods described herein.

Figure 7:
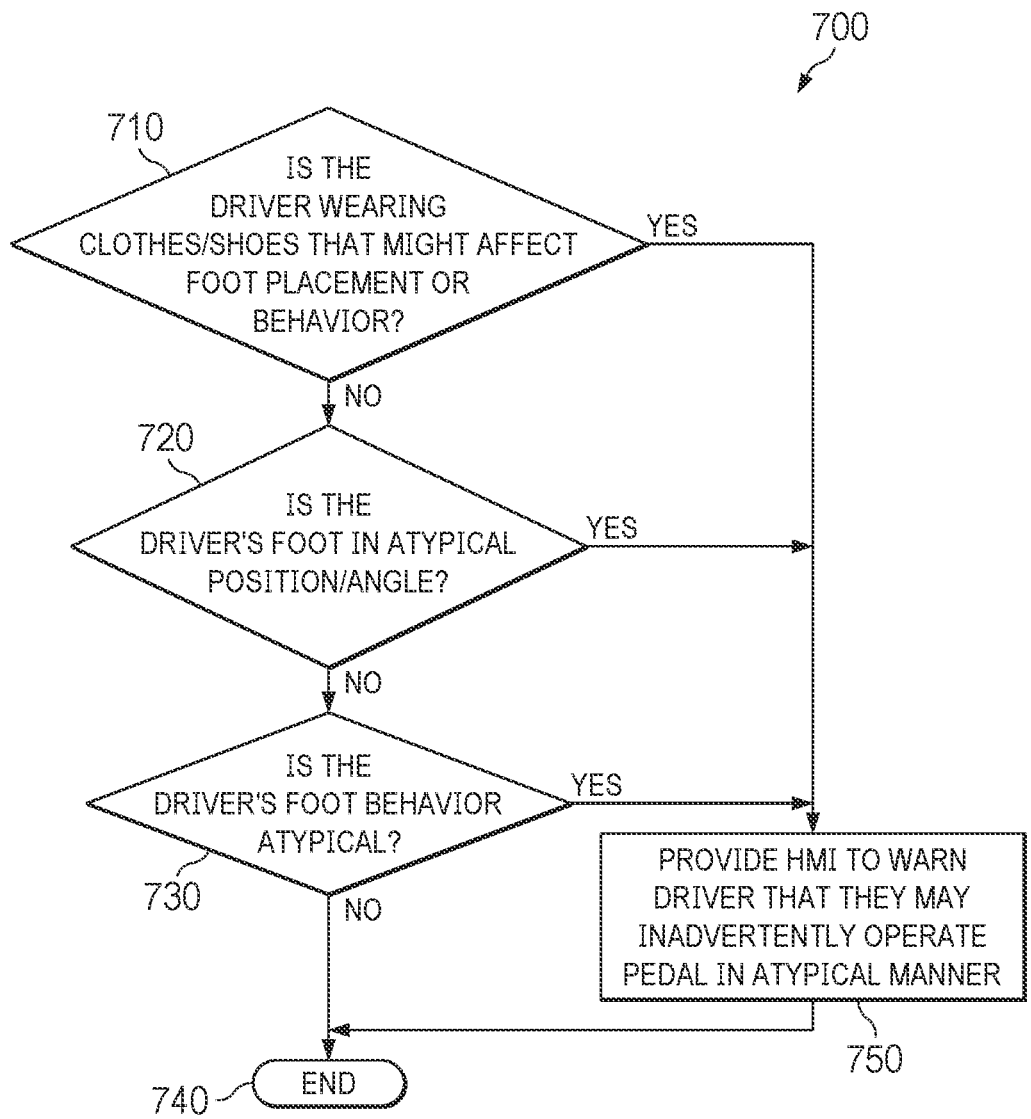
FIG. 7 shows a flow diagram of an example pedal touch anomaly detection method, in accordance with at least one embodiment of the present disclosure.

FIG. 7 shows a flow diagram of an example pedal touch anomaly detection method 700, in accordance with at least one embodiment of the present disclosure. The method 700, or a similar method, may for example be executed by the anomaly detection module 650 of FIG. 6.

In step 710, the method 700 includes determining whether the driver is wearing clothes or footwear that might affect foot placement behavior. This may for example be determined based on information provided by the clothing/footwear identification module 680 of FIG. 6. If yes, execution proceeds to step 750. If no, execution proceeds to step 730.

In step 720, the method 700 includes determining whether the driver's leg of foot as at an atypical position or angle. This may for example be determined based on information provided from the 3D leg model 640 of FIG. 6. If yes, execution proceeds to step 750. If no, execution proceeds to step 730.

In step 730, the method 700 includes determining whether the driver's foot behavior is atypical. This may for example be determined based in information provided by the 4D time/velocity module 645 of FIG. 6. If yes, execution proceeds to step 750. If no, execution proceeds to step 740.

In step 740, the method 700 is complete.

In step 750, the method 700 includes providing a human-machine interface (HMI) notification (e.g., a visible, auditory, or tactile/haptic notification) to warn the driver that they are either operating the pedal in an anomalous manner or are at risk of operating the pedal in an anomalous manner. Execution then proceeds to step 740.

It is noted that flow diagrams are provided herein for exemplary purposes; a person of ordinary skill in the art will recognize myriad variations that nonetheless fall within the scope of the present disclosure. For example, the logic of flow diagrams may be shown as sequential. However, similar logic could be parallel, massively parallel, object oriented, real-time, event-driven, cellular automaton, or otherwise, while accomplishing the same or similar functions. In order to perform the methods described herein, a processor may divide each of the steps described herein into a plurality of machine instructions, and may execute these instructions at the rate of several hundred, several thousand, several million, or several billion per second, in a single processor or across a plurality of processors. Such rapid execution may be necessary in order to execute the method in real time or near-real time as described herein. For example, in order to control downhill acceleration in real time, the pedal touch anomaly notification system 100 may need to execute multiple times per second (e.g., a rate of 10 Hz, 20 Hz, etc.).

Figure 8:
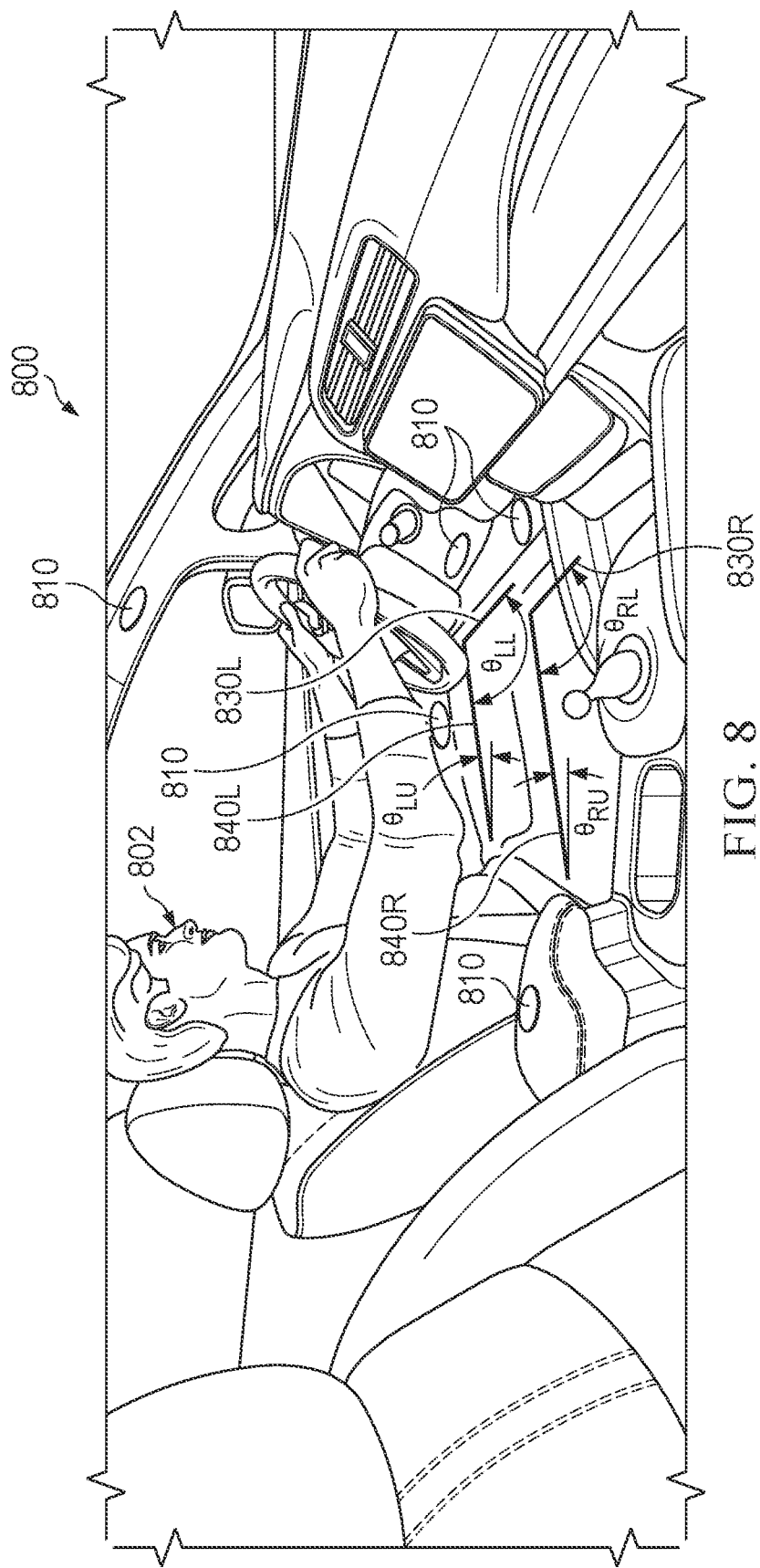
FIG. 8 is a schematic, diagrammatic representation of a driver in the cabin of a vehicle, in accordance with at least one embodiment of the present disclosure.

FIG. 8 is a schematic, diagrammatic representation of a driver 802 in the cabin 800 of a vehicle, in accordance with at least one embodiment of the present disclosure. The driver's left lower leg is represented by a left lower leg centerline 830L, while the driver's right lower leg is represented by a right lower leg centerline 830R. The driver's left upper leg is represented by a left upper leg centerline 840L, while the driver's right upper leg is represented by a right upper leg centerline 840R. The left upper leg centerline 840L forms an angle $\theta_{LU}$ with the horizontal, while the right upper leg centerline 840L forms an angle $\theta_{RU}$ with the horizontal. The lower left leg centerline 830L forms an angle $\theta_{LL}$ with the left upper leg centerline 840L. The lower right leg centerline 830R forms an angle $\theta_{RL}$ with the right upper leg centerline 840R.

In the example shown in FIG. 8, angles $\theta_{LU}$, $\theta_{RU}$, $\theta_{LL}$, and $\theta_{RL}$ can be measured or estimated by a processor or software module (e.g., the pedal touch anomaly detector 142 of FIGS. 1-3) in communication with one or more cabin sensors 810 (e.g., imaging sensors, point cloud depth sensors, or otherwise) located within the cabin 800, or else located outside the cabin 800 but able to view objects within the cabin 800.

The angles $\theta_{LU}$, $\theta_{RU}$, $\theta_{LL}$, and $\theta_{RL}$ may for example be included in the 3D leg model. It is noted that some drivers may operate the pedals of a vehicle using only the right foot, while other drivers may operate the vehicle using only the left foot, and still others may operate the vehicle using both feet (e.g., right foot for the accelerator pedal, and left foot the brake and/or clutch pedals). Any change from a driver's normal foot usage may be considered an anomaly. Thus, in some embodiments, the 3D leg model includes the 3D pose (position and orientation) of each portion of both the right and left legs.

Figure 9:
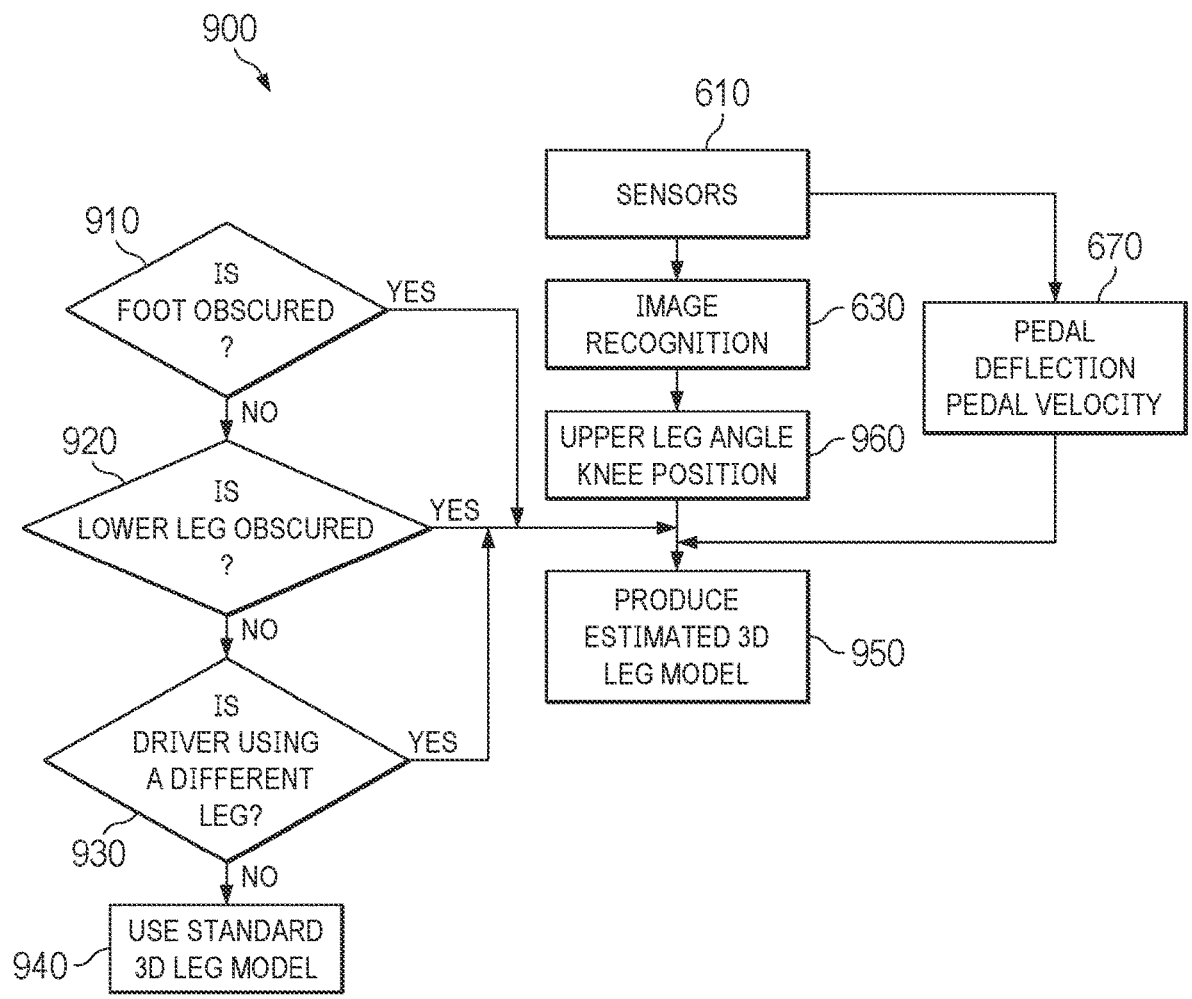
FIG. 9 shows a flow diagram of an example leg pose estimation method, in accordance with at least one embodiment of the present disclosure.

FIG. 9 shows a flow diagram of an example leg pose estimation method 900, in accordance with at least one embodiment of the present disclosure. In some cases, it may not be possible to accurately measure some angles or positions of certain portions of a right or left leg, due to obscuration by clothing, other objects, or the driver's other leg. In such cases, it may be possible to deduce the missing information based on the information that is available. For example, if the angles of the upper leg and ankle are known, then it may be possible to deduce the angle of the lower leg by assuming the lower leg is a straight line connecting the lower end of the upper leg with the upper end of the foot. Similarly, if the ankle angle is not known, but the lower leg angle and the deflection angle of the brake pedal are both known, then the ankle angle may be estimated by assuming the foot is a straight line connecting the lower end of the lower leg to the currently oriented surface of the brake pedal.

In step 910, the method 900 includes determining whether the driver's foot (e.g., the foot that is operating the pedal) is obscured. If yes, execution proceeds to step 950. If no, execution proceeds to step 920.

In step 920, the method 900 includes determining whether the driver's lower leg is obscured. If yes, execution proceeds to step 950. If no, execution proceeds to step 930.

In step 930, the method 900 includes determining whether is using s different leg than the modeled leg, or a different leg than usual. If yes, execution proceeds to step 950. If no, execution proceeds to step 940.

In step 940, the method 900 includes using the standard leg model for pedal touch anomaly detection. The method 900 is now complete.

In step 950, the method 900 includes producing an estimated 3D leg model. In an example, the estimated 3D leg model may be constructed from available information using image recognition 630 on data from the sensors 610 to determine available parameters 960 including but not limited to the upper leg angle, knee position, and other parameters discussed above, as well as pedal status information 670 including but not limited to pedal deflection and pedal velocity. In some embodiments, missing information may be estimated through simple geometric relationships and assumptions as would occur to a person of ordinary skill in the art. In other embodiments, an estimated 3D leg model may be produced by a machine learning (ML) model that uses available information to construct a complete leg pose (e.g., positions and orientations of the upper leg, lower leg, and foot).

Figure 10:
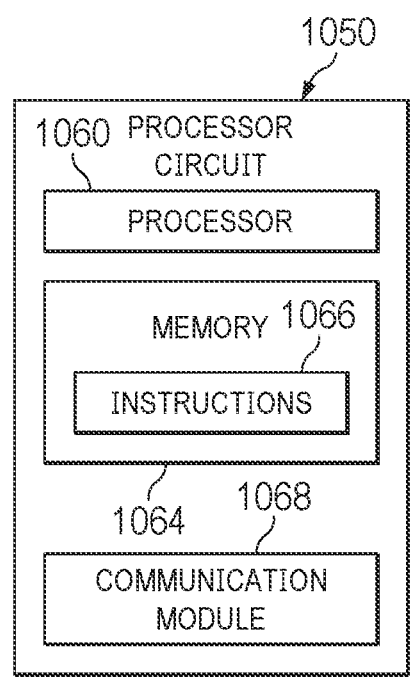
FIG. 10 is a schematic diagram of a processor circuit, in accordance with at least one embodiment of the present disclosure.

FIG. 10 is a schematic diagram of a processor circuit 1050, in accordance with at least one embodiment of the present disclosure. The processor circuit 1050 may be implemented in the system 100, or other devices or workstations (e.g., third-party workstations, network routers, etc.), or on a cloud processor or other remote processing unit, as necessary to implement the method. As shown, the processor circuit 1050 may include a processor 1060, a memory 1064, and a communication module 1068. These elements may be in direct or indirect communication with each other, for example via one or more buses.

The processor 1060 may include a central processing unit (CPU), a digital signal processor (DSP), an ASIC, a controller, or any combination of general-purpose computing devices, reduced instruction set computing (RISC) devices, application-specific integrated circuits (ASICs), field programmable gate arrays (FPGAs), or other related logic devices, including mechanical and quantum computers. The processor 1060 may also comprise another hardware device, a firmware device, or any combination thereof configured to perform the operations described herein. The processor 1060 may also be implemented as a combination of computing devices, e.g., a combination of a DSP and a microprocessor, a plurality of microprocessors, one or more microprocessors in conjunction with a DSP core, or any other such configuration.

The memory 1064 may include a cache memory (e.g., a cache memory of the processor 1060), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 1064 includes a non-transitory computer-readable medium. The memory 1064 may store instructions 1066. The instructions 1066 may include instructions that, when executed by the processor 1060, cause the processor 1060 to perform the operations described herein. Instructions 1066 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The communication module 1068 can include any electronic circuitry and/or logic circuitry to facilitate direct or indirect communication of data between the processor circuit 1050, and other processors or devices. In that regard, the communication module 1068 can be an input/output (I/O) device. In some instances, the communication module 1068 facilitates direct or indirect communication between various elements of the processor circuit 1050 and/or the system 100. The communication module 1068 may communicate within the processor circuit 1050 through numerous methods or protocols. Serial communication protocols may include but are not limited to United States Serial Protocol Interface (US SPI), Inter-Integrated Circuit (I²C), Recommended Standard 232 (RS-232), RS-485, Controller Area Network (CAN), Ethernet, Aeronautical Radio, Incorporated 429 (ARINC 429), MODBUS, Military Standard 1553 (MIL-STD-1553), or any other suitable method or protocol. Parallel protocols include but are not limited to Industry Standard Architecture (ISA), Advanced Technology Attachment (ATA), Small Computer System Interface (SCSI), Peripheral Component Interconnect (PCI), Institute of Electrical and Electronics Engineers 488 (IEEE-488), IEEE-1284, and other suitable protocols. Where appropriate, serial and parallel communications may be bridged by a Universal Asynchronous Receiver Transmitter (UART), Universal Synchronous Receiver Transmitter (USART), or other appropriate subsystem.

External communication (including but not limited to software updates, firmware updates, preset sharing between the processor and central server, or readings from vehicle or environmental sensors) may be accomplished using any suitable wireless or wired communication technology, such as a cable interface such as a universal serial bus (USB), micro USB, Lightning, or Fire Wire interface, Bluetooth, Wi-Fi, ZigBee, Li-Fi, or cellular data connections such as 2G/GSM (global system for mobiles), 3G/UMTS (universal mobile telecommunications system), 4G, long term evolution (LTE), WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information. Information may also be transferred on physical media such as a USB flash drive or memory stick.

As will be readily appreciated by those having ordinary skill in the art after becoming familiar with the teachings herein, the pedal touch anomaly notification system advantageously warns the driver if their pedal touching habits fall outside of normal parameters, or if clothing or footgear are detected that make such anomalous pedal touching more likely. Accordingly, it can be seen that the pedal touch anomaly notification system fills a need in the art, by allowing drivers to change their pedal touching habits before an unsafe situation (e.g., excessive braking or insufficient braking) can occur.

A number of variations are possible on the examples and embodiments described above. For example, although most examples in this disclosure refer to operation of the brake pedal, it is understood that the same principles apply to an accelerator pedal, clutch pedal, emergency brake pedal, etc., as well as other foot-operated controls such as aviation rudders, foot switches for surgical or sewing equipment, etc.

The technology described herein may be implemented on manually controlled vehicles or driver-assist vehicles. The technology may be implemented in diverse combinations of hardware, software, and firmware, depending on the implementation or as necessitated by the structures and modules already present in existing vehicles. The system may be employed on vehicles with automatic transmission, manual transmissions, or vehicles with simulated shifting, including continuously variable transmission (CVT), infinitely variable transmission (IVT), hybrid transmissions (e.g., a hybrid vehicle with 4-speed automatic transmission simulating 10 gears), and fully electric vehicles.

Accordingly, the logical operations making up the embodiments of the technology described herein may be referred to variously as operations, steps, blocks, objects, elements, components, or modules. Furthermore, it should be understood that these may occur or be arranged in any order, unless explicitly claimed otherwise or a specific order is necessitated by the claim language or by the nature of the component or step.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the pedal touch anomaly notification system. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide a complete description of the structure and use of exemplary embodiments of the pedal touch anomaly notification system as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter. For example, additional sensors may be employed, such as capacitive touch sensor or other touch sensors that may be incorporated into the pedals to determine exactly which portions of the pedal are being pressed and which are not. Additionally, sensors external to the vehicle may be employed to provide or supplement any of the sensor data described hereinabove. Alternatively, machine learning algorithms or other AI systems may be used to estimate variables from sparse, noisy, or entwined data streams without departing from the spirit of the present disclosure.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A pedal touch anomaly notification system for a vehicle, the system comprising:
   the vehicle;
   at least one sensor configured to capture information about a position or orientation of a foot of a driver of the vehicle relative to a control pedal of the vehicle;
   a database storing baseline information and variance information about expected positions or orientations of the foot of the driver relative to the control pedal;
   a processor comprising a memory and configured to:
   based on the captured information, determine a 3D model of a leg of the driver and whether a foot of the driver is wearing footwear or is barefoot;
   based on the 3D model and whether the foot of the driver is wearing the footwear or is barefoot, determine the position or orientation of the foot of the driver relative to the control pedal;
   compare the determined position or orientation to the baseline information and variance information; and
   if the position or orientation fall outside the variance information, generate a driver alert.

2. The system of claim 1, wherein the position or orientation of the foot of the driver relative to the control pedal comprises a position of the driver's foot on the control pedal.

3. The system of claim 1, wherein the position or orientation of the foot of the driver relative to the control pedal comprises a portion of the driver's foot on the control pedal.

4. The system of claim 1, wherein the position or orientation of the foot of the driver relative to the control pedal comprises an angle of an ankle of the driver.

5. The system of claim 1,
   wherein the at least one sensor is further configured to capture information about the footwear of the driver, and
   wherein the processor is further configured to:
   identify the footwear of the driver; and
   if the footwear of the driver appears on a list, stored in the database, of problematic footwear, generate the driver alert.

6. The system of claim 1,
   wherein the at least one sensor is further configured to capture information about a clothing item of the driver, and
   wherein the processor is further configured to:
   identify the clothing item of the driver; and
   if the clothing item of the driver appears on a list, stored in the database, of problematic clothing items, generate the driver alert.

7. The system of claim 1,
   wherein the at least one sensor is further configured to capture information about a pedal deflection or pedal velocity of the control pedal, and
   wherein the processor is further configured to:
   compare the pedal deflection or pedal velocity to baseline pedal deflection or pedal velocity information and pedal deflection variance or pedal velocity variance stored in the database; and
   if the pedal deflection or pedal velocity falls outside the pedal deflection variance or pedal velocity variance, generate the driver alert.

8. The system of claim 1,
   wherein the at least one sensor is further configured to capture information about a velocity, acceleration, or jerk of the vehicle, and
   wherein the processor is further configured to:
   compare the velocity, acceleration, or jerk to baseline velocity, acceleration, or jerk information and velocity, acceleration, or jerk variance stored in the database; and
   if the velocity, acceleration, or jerk falls outside the velocity, acceleration, or jerk variance, generate the driver alert.

9. The system of claim 1, wherein the driver alert comprises a text alert or icon.

10. The system of claim 1, wherein the driver alert comprises an auditory or haptic alert.

11. The system of claim 1, wherein the processor is configured to determine the position or orientation of the foot of the driver relative to the control pedal based on the captured information and deduced information.

12. A pedal touch anomaly notification system for a vehicle, the system comprising:
   the vehicle;
   at least one sensor configured to capture information about a position or orientation of a foot of a driver of the vehicle relative to a control pedal of the vehicle;
   a database storing baseline information and variance information about expected positions or orientations of the foot of the driver relative to the control pedal;
   a processor comprising a memory and configured to:
      based on the captured information, determine the position or orientation of the foot of the driver relative to the control pedal;
      compare the determined position or orientation to the baseline information and variance information; and
      if the position or orientation fall outside the variance information, generate a driver alert,
   wherein the vehicle is configured to identify a specific driver, and wherein the baseline information and variance information about expected positions or orientations of the foot of the driver relative to the control pedal is specific to the specific driver.

13. The system of claim 12, wherein the position or orientation of the foot of the driver relative to the control pedal comprises a position of the driver's foot on the control pedal.

14. The system of claim 12, wherein the position or orientation of the foot of the driver relative to the control pedal comprises a portion of the driver's foot on the control pedal.

15. The system of claim 12, wherein the position or orientation of the foot of the driver relative to the control pedal comprises an angle of an ankle of the driver.

16. The system of claim 12,
   wherein the at least one sensor is further configured to capture information about footwear of the driver, and
   wherein the processor is further configured to:
      identify the footwear of the driver; and
      if the footwear of the driver appears on a list, stored in the database, of problematic footwear, generate the driver alert.

17. The system of claim 12,
   wherein the at least one sensor is further configured to capture information about a clothing item of the driver, and
   wherein the processor is further configured to:
      identify the clothing item of the driver; and
      if the clothing item of the driver appears on a list, stored in the database, of problematic clothing items, generate the driver alert.

18. The system of claim 12,
   wherein the at least one sensor is further configured to capture information about a pedal deflection or pedal velocity of the control pedal, and
   wherein the processor is further configured to:
      compare the pedal deflection or pedal velocity to baseline pedal deflection or pedal velocity information and pedal deflection variance or pedal velocity variance stored in the database; and
      if the pedal deflection or pedal velocity falls outside the pedal deflection variance or pedal velocity variance, generate the driver alert.

19. The system of claim 12,
   wherein the at least one sensor is further configured to capture information about a velocity, acceleration, or jerk of the vehicle, and
   wherein the processor is further configured to:
      compare the velocity, acceleration, or jerk to baseline velocity, acceleration, or jerk information and velocity, acceleration, or jerk variance stored in the database; and
      if the velocity, acceleration, or jerk falls outside the velocity, acceleration, or jerk variance, generate the driver alert.

20. The system of claim 12, wherein the driver alert comprises a text alert or icon.

21. The system of claim 12, wherein the driver alert comprises an auditory or haptic alert.

22. The system of claim 12, wherein the processor is configured to determine the position or orientation of the foot of the driver relative to the control pedal based on the captured information and deduced information.

23. A pedal touch anomaly notification system for a vehicle, the system comprising:
   the vehicle;
   at least one sensor configured to capture information about a position or orientation of a foot of a driver of the vehicle relative to a control pedal of the vehicle;
   a database storing baseline information and variance information about expected positions or orientations of the foot of the driver relative to the control pedal;
   a processor comprising a memory and configured to:
      based on the captured information, determine the position or orientation of the foot of the driver relative to the control pedal;
      compare the determined position or orientation to the baseline information and variance information; and
      if the position or orientation fall outside the variance information, generate a driver alert,
   wherein the processor is further configured to update, in the database, based on driving characteristics of the driver, the baseline information and variance information about expected positions or orientations of the foot of the driver relative to the control pedal.

24. The system of claim 23, wherein the position or orientation of the foot of the driver relative to the control pedal comprises a position of the driver's foot on the control pedal.

25. The system of claim 23, wherein the position or orientation of the foot of the driver relative to the control pedal comprises a portion of the driver's foot on the control pedal.

26. The system of claim 23, wherein the position or orientation of the foot of the driver relative to the control pedal comprises an angle of an ankle of the driver.

27. The system of claim 23,
   wherein the at least one sensor is further configured to capture information about footwear of the driver, and
   wherein the processor is further configured to:
      identify the footwear of the driver; and
      if the footwear of the driver appears on a list, stored in the database, of problematic footwear, generate the driver alert.

28. The system of claim 23,
   wherein the at least one sensor is further configured to capture information about a clothing item of the driver, and
   wherein the processor is further configured to:
      identify the clothing item of the driver; and
      if the clothing item of the driver appears on a list, stored in the database, of problematic clothing items, generate the driver alert.

29. The system of claim 23,
wherein the at least one sensor is further configured to capture information about a pedal deflection or pedal velocity of the control pedal, and
wherein the processor is further configured to:
compare the pedal deflection or pedal velocity to baseline pedal deflection or pedal velocity information and pedal deflection variance or pedal velocity variance stored in the database; and
if the pedal deflection or pedal velocity falls outside the pedal deflection variance or pedal velocity variance, generate the driver alert.

30. The system of claim 23,
wherein the at least one sensor is further configured to capture information about a velocity, acceleration, or jerk of the vehicle, and
wherein the processor is further configured to:
compare the velocity, acceleration, or jerk to baseline velocity, acceleration, or jerk information and velocity, acceleration, or jerk variance stored in the database; and
if the velocity, acceleration, or jerk falls outside the velocity, acceleration, or jerk variance, generate the driver alert.

31. The system of claim 23, wherein the driver alert comprises a text alert or icon.

32. The system of claim 23, wherein the driver alert comprises an auditory or haptic alert.

33. The system of claim 23, wherein the processor is configured to determine the position or orientation of the foot of the driver relative to the control pedal based on the captured information and deduced information.

34. A pedal touch anomaly notification method for a vehicle, the method comprising:
with at least one sensor, capturing information about a position or orientation of a foot of a driver of the vehicle relative to a control pedal of the vehicle;
with a database, storing baseline information and variance information about expected positions or orientations of the foot of the driver relative to the control pedal;
with a processor comprising a memory:
based on the captured information, determining a 3D model of a leg of the driver and whether a foot of the driver is wearing footwear or is barefoot;
based on the 3D model and whether a foot of the driver is wearing the footwear or is barefoot, determining the position or orientation of the foot of the driver relative to the control pedal;
comparing the determined position or orientation to the baseline information and variance information; and
if the position or orientation fall outside the variance information, generating a driver alert.

35. The method of claim 34, further comprising:
with the at least one sensor, capturing information about the footwear of the driver; and
with the processor:
identifying the footwear of the driver; and
if the footwear of the driver appears on a list, stored in the database, of problematic footwear, generating the driver alert.

36. The method of claim 34, further comprising:
with the at least one sensor, capturing information about a clothing item of the driver; and
with the processor:
identify the clothing item of the driver; and
if the clothing item of the driver appears on a list, stored in the database, of problematic clothing items, generating the driver alert.

37. The method of claim 34, further comprising:
with the at least one sensor, capturing information about a pedal deflection or pedal velocity of the control pedal, and
with the processor:
comparing the pedal deflection or pedal velocity to baseline pedal deflection or pedal velocity information and pedal deflection variance or pedal velocity variance stored in the database; and
if the pedal deflection or pedal velocity falls outside the pedal deflection variance or pedal velocity variance, generating the driver alert.

38. The method of claim 34, further comprising:
with the at least one sensor, capturing information about a velocity, acceleration, or jerk of the vehicle, and
with the processor:
comparing the velocity, acceleration, or jerk to baseline velocity, acceleration, or jerk information and velocity, acceleration, or jerk variance stored in the database; and
if the velocity, acceleration, or jerk falls outside the velocity, acceleration, or jerk variance, generating the driver alert.

39. A pedal touch anomaly notification method for a vehicle, the method comprising:
with at least one sensor, capturing information about a position or orientation of a foot of a driver of the vehicle relative to a control pedal of the vehicle;
with a database, storing baseline information and variance information about expected positions or orientations of the foot of the driver relative to the control pedal;
with a processor comprising a memory:
based on the captured information, determining the position or orientation of the foot of the driver relative to the control pedal;
comparing the determined position or orientation to the baseline information and variance information; and
if the position or orientation fall outside the variance information, generating a driver alert,
wherein the vehicle is configured to identify a specific driver, and wherein the baseline information and variance information about expected positions or orientations of the foot of the driver relative to the control pedal is specific to the specific driver.

40. The method of claim 39, further comprising:
with the at least one sensor, capturing information about footwear of the driver; and
with the processor:
identifying the footwear of the driver; and
if the footwear of the driver appears on a list, stored in the database, of problematic footwear, generating the driver alert.

41. The method of claim 39, further comprising:
with the at least one sensor, capturing information about a clothing item of the driver; and
with the processor:
identify the clothing item of the driver; and
if the clothing item of the driver appears on a list, stored in the database, of problematic clothing items, generating the driver alert.

42. The method of claim 39, further comprising:
with the at least one sensor, capturing information about a pedal deflection or pedal velocity of the control pedal, and with the processor:
comparing the pedal deflection or pedal velocity to baseline pedal deflection or pedal velocity information and pedal deflection variance or pedal velocity variance stored in the database; and
if the pedal deflection or pedal velocity falls outside the pedal deflection variance or pedal velocity variance, generating the driver alert.

43. The method of claim 39, further comprising:
with the at least one sensor, capturing information about a velocity, acceleration, or jerk of the vehicle, and
with the processor:
comparing the velocity, acceleration, or jerk to baseline velocity, acceleration, or jerk information and velocity, acceleration, or jerk variance stored in the database; and
if the velocity, acceleration, or jerk falls outside the velocity, acceleration, or jerk variance, generating the driver alert.

44. A pedal touch anomaly notification method for a vehicle, the method comprising:
with at least one sensor, capturing information about a position or orientation of a foot of a driver of the vehicle relative to a control pedal of the vehicle;
with a database, storing baseline information and variance information about expected positions or orientations of the foot of the driver relative to the control pedal;
with a processor comprising a memory:
based on the captured information, determining the position or orientation of the foot of the driver relative to the control pedal;
comparing the determined position or orientation to the baseline information and variance information;
if the position or orientation fall outside the variance information, generating a driver alert; and
updating, in the database, based on driving characteristics of the driver, the baseline information and variance information about expected positions or orientations of the foot of the driver relative to the control pedal.

45. The method of claim 44, further comprising:
with the at least one sensor, capturing information about footwear of the driver; and
with the processor:
identifying the footwear of the driver; and
if the footwear of the driver appears on a list, stored in the database, of problematic footwear, generating the driver alert.

46. The method of claim 44, further comprising:
with the at least one sensor, capturing information about a clothing item of the driver; and
with the processor:
identify the clothing item of the driver; and
if the clothing item of the driver appears on a list, stored in the database, of problematic clothing items, generating the driver alert.

47. The method of claim 44, further comprising:
with the at least one sensor, capturing information about a pedal deflection or pedal velocity of the control pedal, and
with the processor:
comparing the pedal deflection or pedal velocity to baseline pedal deflection or pedal velocity information and pedal deflection variance or pedal velocity variance stored in the database; and
if the pedal deflection or pedal velocity falls outside the pedal deflection variance or pedal velocity variance, generating the driver alert.

48. The method of claim 44, further comprising:
with the at least one sensor, capturing information about a velocity, acceleration, or jerk of the vehicle, and
with the processor:
comparing the velocity, acceleration, or jerk to baseline velocity, acceleration, or jerk information and velocity, acceleration, or jerk variance stored in the database; and
if the velocity, acceleration, or jerk falls outside the velocity, acceleration, or jerk variance, generating the driver alert.

* * * * *